United States Patent
Yang et al.

(10) Patent No.: US 11,079,460 B2
(45) Date of Patent: Aug. 3, 2021

(54) POSITION DETERMINATION DEVICE FOR TERMINAL

(71) Applicant: DOOSAN HEAVY INDUSTRIES & CONSTRUCTION CO., LTD., Changwon-si (KR)

(72) Inventors: Seong Yeol Yang, Yongin-si (KR); Seock Moon Yoon, Daejeon (KR); Young Hoon Seo, Suwon-si (KR); Seung Take Oh, Daejeon (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 303 days.

(21) Appl. No.: 16/253,419

(22) Filed: Jan. 22, 2019

(65) Prior Publication Data

US 2019/0265325 A1    Aug. 29, 2019

(30) Foreign Application Priority Data

Feb. 28, 2018  (KR) .......................... 10-2018-0024350
Mar. 7, 2018   (KR) .......................... 10-2018-0026869

(51) Int. Cl.
 *G01S 1/04* (2006.01)
 *H04W 52/02* (2009.01)
 (Continued)

(52) U.S. Cl.
 CPC ................ *G01S 1/042* (2013.01); *G01S 1/38* (2013.01); *G01S 5/0009* (2013.01); *H04W 52/0254* (2013.01)

(58) Field of Classification Search
 CPC ... G01S 1/02; G01S 1/68; G01S 1/042; G01S 1/38; G01S 5/0009; G01S 19/11; H04W 52/0254; F42B 12/385
 (Continued)

(56) References Cited

U.S. PATENT DOCUMENTS 9,807,725 B1 * 10/2017 Vitus .......................... G01S 1/00
2014/0191868 A1 *  7/2014 Ortiz ................. H04W 12/1206
                                                   340/539.13
(Continued)

FOREIGN PATENT DOCUMENTS

KR       20010041081 A     5/2001
KR       20050121176 A    12/2005
(Continued)

OTHER PUBLICATIONS

A Korean Office Action dated Apr. 6, 2019 in connection with Korean Patent Application No. 10-2018-0024350 which corresponds to the above-referenced U.S. application.

(Continued)

*Primary Examiner* — Harry K Liu
(74) *Attorney, Agent, or Firm* — Invenstone Patent, LLC (57) ABSTRACT

A position determination device determines the position of a terminal. A signal of a sensor attached to one or both of a beacon and a terminal is sampled, so that a signal of the beacon may be transmitted and received only when the beacon or the terminal has moved. A plurality of beacons sequentially transmit beacon signals to determine the terminal position by determining a distance between the respective beacons and the terminal based on a time to receive the beacons. The device includes a beacon for transmitting a beacon signal; a terminal for receiving the beacon signal; and a first sensor attached to the terminal to sense movement of the terminal and to output a first sensing signal indicative of the sensed movement. The terminal has a reception mode for receiving the beacon signal and turns on/off the reception mode based on the first sensing signal.

19 Claims, 8 Drawing Sheets

(51) Int. Cl.
  *G01S 1/38*   (2006.01)
  *G01S 5/00*   (2006.01)
(58) Field of Classification Search
  USPC .......................................................... 342/386
  See application file for complete search history.

(56) References Cited

U.S. PATENT DOCUMENTS

| | | | |
|---|---|---|---|
| 2015/0077245 A1* | 3/2015 | Kaufman | A61B 5/165 |
| | | | 340/539.12 |
| 2016/0261986 A1* | 9/2016 | Nord | H04W 4/023 |
| 2017/0082726 A1* | 3/2017 | Gassion | G06Q 10/20 |
| 2017/0311264 A1* | 10/2017 | Raghupathy | G01S 5/0221 |

FOREIGN PATENT DOCUMENTS

| | | |
|---|---|---|
| KR | 2016-0025942 A | 3/2016 |
| KR | 2017-0005094 A | 1/2017 |
| KR | 2017-0024869 A | 3/2017 |
| KR | 2018-0000522 A | 1/2018 |

OTHER PUBLICATIONS

A Korean Office Action dated Nov. 12, 2019 in connection with Korean Patent Application No. 10-2018-0026869 which corresponds to the above-referenced U.S. application.

\* cited by examiner

POSITION DETERMINATION DEVICE FOR TERMINAL

CROSS-REFERENCE TO RELATED APPLICATIONS

This application claims priority to Korean Patent Application Nos. 10-2018-0024350 and 10-2018-0026869, filed on Feb. 28, 2018, and Mar. 7, 2018, respectively, the disclosures of which are incorporated herein by reference in their entirety.

BACKGROUND OF THE DISCLOSURE

Field of the Disclosure

The present disclosure relates to a position determination device, and more particularly, to a device for determining the position of a terminal, in which a signal of a sensor attached to at least one of a beacon and a terminal is sampled, so that a signal of the beacon may be transmitted and received only when at least one of the beacon and the terminal has moved, and in which a plurality of beacons sequentially transmit beacon signals to determine the terminal position by determining a distance between the respective beacons and the terminal based on a time to receive the beacons.

Description of the Related Art

Global positioning system (GPS) technology, which was originally developed for military use, is now widely used for civilian purposes such as navigation, distance measurement, and cartography. Meanwhile, a location based service (LBS) using a GPS receiver as a positioning sensor is being commercialized. However, the GPS receiver may not reliably receive a GPS satellite signal in obstructed areas including indoor areas, areas occupied by high-rise buildings, and subterranean areas such an underground parking lot, subway, or tunnel. For this reason, the GPS receiver may not provide continuous position information to a user located in such areas.

In order to solve such a problem, a beacon may be installed inside the obstructed area so that position information can be obtained using a beacon signal of the beacon. The beacon is a device for determining a position of a terminal using Bluetooth technology. The beacon may periodically transmit a signal, and when the terminal is present within the reception range of the beacon, the terminal may receive a signal transmitted by the beacon to measure a distance between the terminal and the beacon.

However, when the distance between the beacon and the terminal is too close, a reception time for the beacon signal to be received by the terminal becomes shortened. Short reception times tend to reduce the accuracy of the signal. In order to solve such a problem, a method for measuring the distance between the terminal and the beacon using a signal received several times from one beacon is being used. However, such a method necessitates waiting until the beacon transmits a signal and then transmits a next signal. Moreover, in order to measure the distance between the beacon and the terminal, the wait for transmission of the subsequent signals increases as the number of signals received from the beacon increases.

In addition, transmission of the beacon signal continues even when there is no movement by a stationary terminal whose position is being determined using the beacon signal. That is, even if there is no change in position, the beacon continuously transmits the beacon signal, thus consuming the battery of the beacon.

SUMMARY OF THE DISCLOSURE

The present disclosure is intended to solve the above-described problems, and an object of the present disclosure is to provide a position determination device for a terminal, which samples a signal of a sensor attached to a beacon or a terminal to transmit or receive a signal of the beacon only when a position of the beacon or the terminal varies.

It is another object of the present disclosure to provide a position determination device for a terminal, which synchronizes a plurality of beacons to sequentially transmit beacon signals, determines a distance between the respective beacons and a terminal based on a reception time for receiving the signals, and determines a position of the terminal through the distance between the respective beacons and the terminal.

Other than the above-described objects of the present disclosure, other features and advantages of the present disclosure will be described hereinafter, or can be clearly understood by those skilled in the art to which the present disclosure pertains from the technology and the descriptions thereof.

According to one aspect of the present disclosure, there is provided a device for determining a position of a terminal. The device may include a beacon for transmitting a beacon signal; a terminal for receiving the beacon signal; and a first sensor attached to the terminal and configured to sense movement of the terminal and to output a first sensing signal indicative of the sensed movement, wherein the terminal has a reception mode for receiving the beacon signal and is configured to turn on/off the reception mode based on the first sensing signal.

The first sensor may include one of an acceleration sensor, a gyro sensor, a motion sensor, and a displacement sensor.

The terminal may be configured to turn on the reception mode when the outputted first sensing signal indicates that movement of the terminal is being sensed, and to turn off the reception mode when the outputted first sensing signal indicates that no movement of the terminal is being sensed.

The device may further include a second sensor attached to the beacon and configured to sense movement of the beacon and to output a second sensing signal indicative of the sensed movement. The second sensor may include one of an acceleration sensor, a gyro sensor, a motion sensor, and a displacement sensor. The beacon may be configured to transmit the beacon signal when the outputted second sensing signal indicates that movement of the beacon is being sensed.

The device may further include a measurement unit connected to the terminal, and the beacon may consist of a plurality of beacons for respectively transmitting a plurality of beacon signals. The measurement unit may be configured to determine a current position of the terminal based on the beacon signal received by the terminal from each of the beacons.

The terminal may be configured to receive from the measurement unit information indicative of the current position of the terminal and to transmit the position information to a central control unit.

According to another aspect of the present disclosure, there is further provided a device for determining a position of a terminal, and the device may include a beacon for transmitting a beacon signal; a terminal for receiving the beacon signal; and a sensor attached to the beacon and configured to sense movement of the beacon and to output a sensing signal indicative of the sensed movement, wherein the beacon is configured to transmit the beacon signal when the outputted sensing signal indicates that movement of the beacon is being sensed. The device may further include a measurement unit connected to the terminal and configured to determine a current position of the terminal based on the beacon signal received by the terminal from the beacon.

According to another aspect of the present disclosure, there is further provided a device for determining a position of a terminal, and the device may include a first beacon for transmitting a first beacon signal; a second beacon for receiving the first beacon signal and for transmitting a second beacon signal after a first waiting time from the reception of the first beacon signal by the second beacon; and a terminal for receiving the first beacon signal and the second beacon signal, the first beacon signal being received by the terminal at a first reception time from the transmission of the first beacon signal and the second beacon signal being received by the terminal at a second reception time from the transmission of the second beacon signal, wherein the first beacon signal is transmitted from the first beacon to the second beacon during a first propagation time, and wherein the terminal is configured to determine a distance between the first beacon and the terminal based on the first reception time, and to determine a distance between the second beacon and the terminal by reflecting the first propagation time and the first waiting time to the second reception time.

The first waiting time may include a time required for the second beacon to wait before transmitting the second beacon signal after receiving the first beacon signal.

The first propagation time and the first waiting time may be predetermined values, and wherein the terminal may be configured to determine the first arrival time by reflecting the first propagation time and the first waiting time to the second reception time, and to determine the distance between the second beacon and the terminal based on the first arrival time.

The device may further include a third beacon for receiving the second beacon signal and for transmitting a third beacon signal after a second waiting time from the reception of the second beacon signal by the third beacon, and the second waiting time may include a time required for the third beacon to wait before transmitting the third beacon signal after receiving the second beacon signal. The second beacon signal may be transmitted from the second beacon to the third beacon during a second propagation time, and the third beacon signal may be received by the terminal at a third reception time from the transmission of the third beacon signal. Here, the terminal may be configured to determine a distance between the third beacon and the terminal by reflecting the first propagation time, the first waiting time, the second propagation time, and the second waiting time to the third reception time.

The terminal may further include a storage unit for storing values of the first propagation time, the first waiting time, the second propagation time, and the second waiting time.

The third reception time may include the first propagation time, the first waiting time, the second propagation time, the second waiting time, and a second arrival time of the third beacon being transmitted from the third beacon to the terminal. Here, the first propagation time, the second propagation time, the first waiting time, and the second waiting time may be predetermined values, and the terminal is configured to determine a third arrival time by reflecting the first propagation time, the first waiting time, the second propagation time, and the second waiting time to the third reception time; and to determine the distance between the third beacon and the terminal based on the second arrival time.

The terminal position determination device according to an embodiment of the present disclosure may determine an accurate position even if the terminal moves.

In addition, a beacon used by the device of the present disclosure may transmit the beacon signal only when the beacon moves, thus conserving battery power of the beacon, and a terminal whose position is being determined by the device may receive the beacon signal only when the terminal moves, thus conserving battery power of the terminal.

The terminal position determination device according to an embodiment of the present disclosure may receive a signal from a plurality of beacons to accurately determine the position of the terminal.

In addition, in order to solve the problem of short reception times reduce the accuracy of measuring the distance between the terminal and the beacon, the device of the present disclosure may increase the reception time during which the beacon signal is received by the terminal to accurately determine the position of the terminal. In addition, other features and advantages of the present disclosure may newly be confirmed through the embodiments of the present disclosure as well.

DESCRIPTION OF SPECIFIC EMBODIMENTS

Hereinafter, exemplary embodiments of the present disclosure will be described in detail with reference to the accompanying drawings so that those skilled in the art to which the present disclosure pertains may easily practice the present disclosure. The present disclosure may be implemented in various different forms, and is not limited to the exemplary embodiments described herein.

In order to clearly illustrate the present disclosure, parts not related to the description are omitted, and like parts are denoted by similar reference numerals throughout the specification.

Throughout this specification, it will be understood that when an element is referred to as being "connected" to another element, it may be "directly connected" to the other element or "electrically connected" to the other element with other elements interposed therebetween. It will be further understood that when an element is referred to as "comprises" another element, the element is intended not to exclude other elements, but to further include other elements, unless the context clearly indicates otherwise.

When it is described that any one part is "on" the other part, it may mean that the part is directly on the other part or any other part is interposed therebetween. On the contrary, when it is described that any one part is "directly on" the other part, there is no other part interposed therebetween.

The terms "first," "second," "third" and the like are used to illustrate different parts, components, areas, layers and/or sections, but are not limited thereto. The terms are only used to differentiate a certain part, component, area, layer or section from other part, component, area, layer or section. Accordingly, a first part, component, area, layer or section, which will be mentioned hereinafter, may be referred to as a second part, component, area, layer or section without departing from the scope of the present disclosure.

The terminology used herein is for the purpose of describing particular embodiments only and is not intended to limit the present disclosure. As used herein, the singular forms are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, and/or components.

Terms "below," "above," and the like indicating a relative space may be used to more easily describe a relationship between one part illustrated in the drawings with another part. These terms are intended to include other meanings or operations of a device that is being used, in addition to meanings intended in the drawings. For example, when the device in the drawing is inverted, any parts described as being "below" other parts may be described as being "above" the other parts. Therefore, the exemplary term "below" includes both of an upper direction and a lower direction. The device may rotate by 90° or other angles, and the terms indicating a relative space are also interpreted according thereto.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be additionally interpreted as having a meaning that is consistent with their meaning in the context of the relevant art and/or the present disclosure, and will not be interpreted in an idealized or overly formal sense unless expressly so defined herein.

Hereinafter, exemplary embodiments of the present disclosure will be described in detail with reference to the accompanying drawings so that those skilled in the art to which the present disclosure pertains may easily practice the present disclosure. However, the present disclosure may be implemented in various different forms, and is not limited to the exemplary embodiments described herein.

Figure 1:
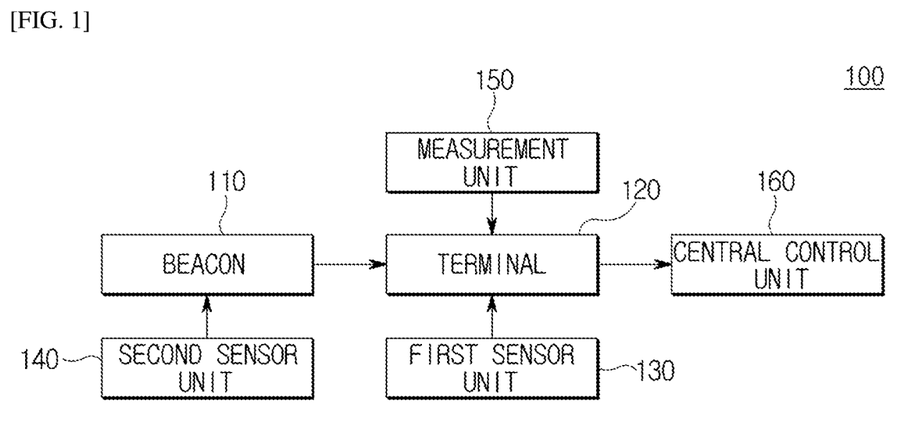
FIG. 1 is a block diagram of a position determination device for a terminal according to an embodiment of the present disclosure.

FIG. 1 illustrates a configuration of a device 100 for determining the position of a terminal according to an embodiment of the present disclosure.

Referring to FIG. 1, the device 100 may include a beacon 110, a terminal 120, a first sensor unit 130, a second sensor unit 140, a measurement unit 150, and a central control unit 160.

The beacon 110 may transmit a beacon signal. The beacon 110 may transmit the beacon signal to any terminal 120 that is present within the reception range of the beacon 110 and may transmit the beacon signal to all such terminals 120 that are present within the reception range of the beacon 110. The beacon 110 may consist of a plurality of beacons 110 respectively installed at a plurality of positions, and each beacon 110 may transmit a beacon signal from a corresponding position of the plurality of positions. The beacon signal may include information indicating a distance between the beacon 110 and the terminal 120. At this time, the beacon 110 may transmit the beacon signal based on a sensing signal generated by the second sensor unit 140.

The first sensor unit 130 may be attached to the terminal 120 to sense the movement of the terminal 120. The first sensor unit 130 may include any one of an acceleration sensor, a gyro sensor, a motion sensor, and a displacement sensor. A first sensing signal, in which the first sensor unit 130 senses movement of the terminal 120, may be a signal indicating whether the terminal 120 has moved and may include information indicative of the distance and/or directionality of the movement of the terminal 120. The first sensor unit 130 may periodically sense the movement of the terminal 120, and while the terminal 120 does not move, may generate a steady-state signal as the first sensing signal. On the other hand, when the terminal 120 moves, the first sensing signal may vary from its steady state.

The terminal 120 may receive the beacon signal. The terminal 120 may turn on/off a reception mode for receiving the beacon signal based on the first sensing signal generated by the first sensor unit 130. The reception mode may be a mode in which the terminal 120 receives the beacon signal transmitted by the beacon 110. For example, turning on/off the reception mode may be achieved by turning on/off (enabling/disabling) a Bluetooth function of the terminal 120. Specifically, when it is determined that the terminal 120 has moved, the terminal 120 may turn on the reception mode to receive the beacon signal. On the other hand, when it is determined that the terminal 120 has not moved, for example, during a predetermined sampling period, the terminal 120 may turn off its reception mode in order for the beacon signal to not be received. That is, the terminal 120 may turn on/off the reception mode to prevent the beacon signal from being unnecessarily received while the terminal 120 does not move.

For example, when the first sensor unit 130 senses whether the terminal 120 has moved and the resulting first sensing signal is a steady-state signal indicative of no sensed movement of the terminal 120, the terminal 120 determines that the terminal 120 has not moved and thus turns off the reception mode. The terminal 120 may turn off the reception mode so as to not receive a beacon signal. On the other hand, when the first sensor unit 130 senses whether the terminal 120 has moved and the resulting first sensing signal is a signal varying from the steady-state signal and is thus indicative of sensed movement of the terminal 120, the terminal 120 determines that the terminal 120 has moved and thus turns on the reception mode. The terminal 120 may turn on the reception mode in order to receive a beacon signal. When movement of the terminal 120 is sensed, the terminal 120 may continuously receive the beacon signal transmitted by the beacon 110. In addition, the terminal 120 may periodically receive the beacon signal to determine a distance and/or direction in which the terminal 120 moves and the resulting position of the terminal 120. The terminal 120 may receive the beacon signal only when the terminal 120 has moved, thus conserving the power of a battery (not shown) of the terminal 120 that may be consumed in receiving a beacon signal The terminal 120 may further include the measurement unit 150 for determining a position of the terminal 120 based on the beacon signal received from each of the beacons 110. As the number of beacon signals received by the terminal 120 increases, the measurement unit 150 may determine the position of the terminal more precisely. The measurement unit 150 may confirm information on distances between the terminal 120 and the respective beacons 110 based on the beacon signals received from a plurality of positions, and may determine the position of the terminal 120 based on the distance information. The measurement unit 150 may determine the position of the terminal 120 so that information indicative of the determined position may be transmitted to the central control unit 160.

The central control unit 160 may display the position of the terminal 120 transmitted by the measurement unit 150 on a display so that a user may confirm it.

The second sensor unit 140 may be attached to the beacon 110 to sense the movement of the beacon 110. The second sensor unit 140 may include any one of an acceleration sensor, a gyro sensor, a motion sensor, and a displacement sensor. A second sensing signal, in which the second sensor unit 140 senses movement of the beacon 110, may be a signal indicating whether the beacon 110 has moved and may include information indicative of the distance and/or directionality of the movement of the beacon 110. The second sensor unit 140 may periodically sense movement of the beacon 110, and when the sensing determines that the beacon 110 has not moved, the second sensor unit 140 may generate a steady-state signal as the second sensing signal, that is, a signal indicative of no sensed movement of the beacon 110. On the other hand, when the sensing determines that the beacon 110 has moved, the resulting second sensing signal may be a signal varying from the steady-state signal and is thus indicative of sensed movement of the beacon 110.

The beacon 110 may transmit the beacon signal based on the second sensing signal generated by the second sensor unit 140. That is, the beacon 110 may not transmit the beacon signal when the second sensing signal is generated as a steady state signal and may transmit the beacon signal when the second sensing signal varies from the steady-state signal. In other words, the beacon signal is transmitted when it is determined by the state of the second sensing signal that the beacon 110 has moved. Here, the terminal 120 may receive the beacon signal transmitted by the beacon 110, and the measurement unit 150 may determine the position of the terminal 120 again using the newly received beacon signal.

For example, when the second sensor unit 140 senses whether the beacon 110 has moved and the resulting second sensing signal is a steady-state signal indicative of no sensed movement of the beacon 110, the beacon 110 determines that the beacon 110 has not moved and thus does not transmit the beacon signal. On the other hand, when the second sensor unit 140 senses whether the beacon 110 has moved and the resulting second sensing signal is a signal varying from the steady-state signal and is thus indicative of sensed movement of the beacon 110, the beacon 110 determines that the beacon 110 has moved and thus transmits the beacon signal. Therefore, when movement of the beacon 110 is sensed, the beacon 110 may continuously output the beacon signal, and the terminal 120 may periodically receive the beacon signal to accurately determine the current position of the terminal 120. In addition, the beacon 110 may transmit the beacon signal for determining the position of the terminal 120 only when the beacon 110 has moved, thus conserving the power of a battery (not shown) of the beacon 110 that may be consumed in transmitting a beacon signal.

In addition, when each of the first and second sensing units 130 and 140 output a sensing signal that varies from a previous steady state, it may be determined that both the terminal 120 and the beacon 110 have moved. In this case, the beacon 110 may transmit the beacon signal, and the terminal 120 may turn on the reception mode to receive the beacon signal transmitted by the beacon 110.

Figure 2:
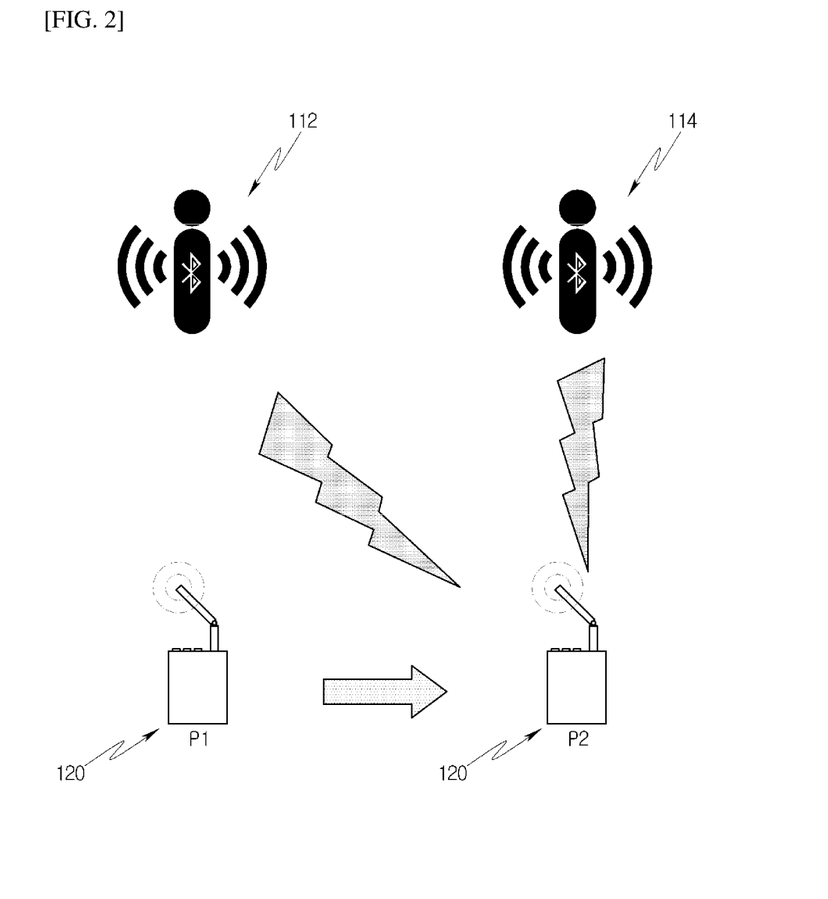
FIG. 2 is a diagram illustrating determining a position of a terminal when the terminal has moved according to an embodiment of the present disclosure.

FIG. 2 illustrates an instance of terminal position determination according to an embodiment of the present disclosure, in the event that the terminal has moved.

Referring to FIGS. 1 and 2, the beacon 110 may include a first beacon 112 and a second beacon 114 disposed at different positions. The terminal 120 may be present within the overlapping reception ranges of the first beacon 112 and the second beacon 114, and the first sensor unit 130 is attached to the terminal 120 to sense the movement of the terminal 120. Here, when the terminal 120 is stopped (stationary) at a first position P1, the first sensing signal of the first sensor unit 130 may maintain a steady state. The terminal 120 may, through the steady-state of the first sensing signal, determine that the terminal 120 has stopped, at which time the terminal 120 may turn off the reception mode for receiving the beacon signal so that the beacon signal is not received. This prevents the beacon signal from being unnecessarily received while the position of the terminal 120 does not vary, thus saving the battery of the terminal 120.

When the terminal 120 has moved from the first position P1 to a second position P2, the first sensing signal of the first sensor unit 130 may vary from its previous steady state. The terminal 120 may determine that the terminal 120 has moved through the varied first sensing signal, at which time the terminal 120 may turn on the reception mode for receiving the beacon signal so that the beacon signal may be received. This enables a varying position to be determined again. Here, the measurement unit 150 may determine the position of the terminal 120 using beacon signals respectively received from the first and second beacons 112 and 114 and may transmit the determined position of the terminal 120 to the central control unit 160. The central control unit 160 may store information on the received position of the terminal 120. The central control unit 160 may be a platform for displaying the position information of the terminal 120, and such a platform may be applied to a smart factory. For example, when a system according to an embodiment of the present disclosure is applied to a warehouse, it may be regarded that the beacon 110 is attached to a shelf on which one or more objects are stored, where the terminal 120 is attached to each of the objects. In this case, when an object is moved, the terminal 120 may determine that the object has moved through the first sensor unit 130 to turn on the reception mode. Since the beacon 110 may periodically transmit the beacon signal, the terminal 120 may receive the beacon signal after turning on the reception mode. The terminal 120 may determine the position of the terminal 120 through the received beacon signal and may transmit information indicative of the position of the terminal 120 to the central control unit 160. The central control unit 160 may determine on which shelf and in which position the object is currently disposed, based on the transmitted position information of the terminal 120.

Figure 3:
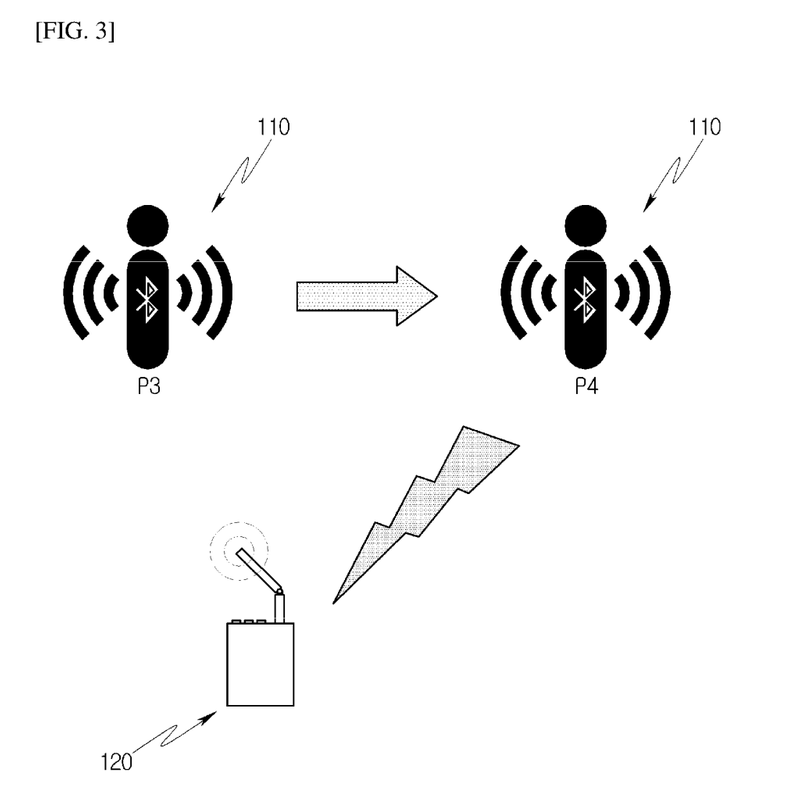
FIG. 3 is a diagram illustrating determining a position of a terminal when a beacon has moved according to an embodiment of the present disclosure.

FIG. 3 illustrates an instance of terminal position determination according to an embodiment of the present disclosure, in the event that a beacon has moved.

Referring to FIGS. 1 and 3, the terminal 120 may be present within the reception range of the beacon 110, and the second sensor unit 140 may be attached to the beacon 110 to sense the movement of the beacon 110. Here, when the beacon 110 is stopped (stationary) at a third position P3, a second sensing signal of the second sensor unit 140 may be constant. The beacon 110 may determine that the beacon 110 has stopped through the second sensing signal which is constantly displayed, at which time the beacon 110 may not transmit the beacon signal. This prevents the beacon signal from being unnecessarily transmitted while the position of the beacon 110 does not vary, thus saving the battery of the beacon 110.

When the beacon 110 has moved from the third position P3 to a fourth position P4, the second sensing signal of the second sensor unit 140 may vary from a previous steady state. The beacon 110 may determine that the beacon 110 has moved through the varied second sensing signal, at which time the beacon 110 may transmit the beacon signal for determining the position of the terminal 120. This enables a fresh determination of the distance between the beacon 110 and the terminal 120 at the varied position of the beacon 110.

Thereafter, the measurement unit 150 may determine the position of the terminal 120 using the received beacon signal and may transmit the determined position of the terminal 120 to the central control unit 160. The central control unit 160 may be a platform for displaying the position information of the terminal 120, and such a platform may be applied to a smart factory. For example, when a system according to an embodiment of the present disclosure is applied to a warehouse, it may be regarded that the terminal 120 is attached to a shelf on which one or more objects are stored, where the beacon 110 is attached to each of the objects. In this case, when an object is moved, the beacon 110 may determine that the object has moved through the second sensor unit 140 and may thus transmit the beacon signal. The terminal 120 may receive the beacon signal transmitted by the beacon 110 to determine the position of the terminal 120 and may transmit information indicative of the position of the terminal 120 to the central control unit 160. The central control unit 160 may determine on which shelf and in which position the object is currently disposed based on the transmitted position information of the terminal 120.

Figure 4:
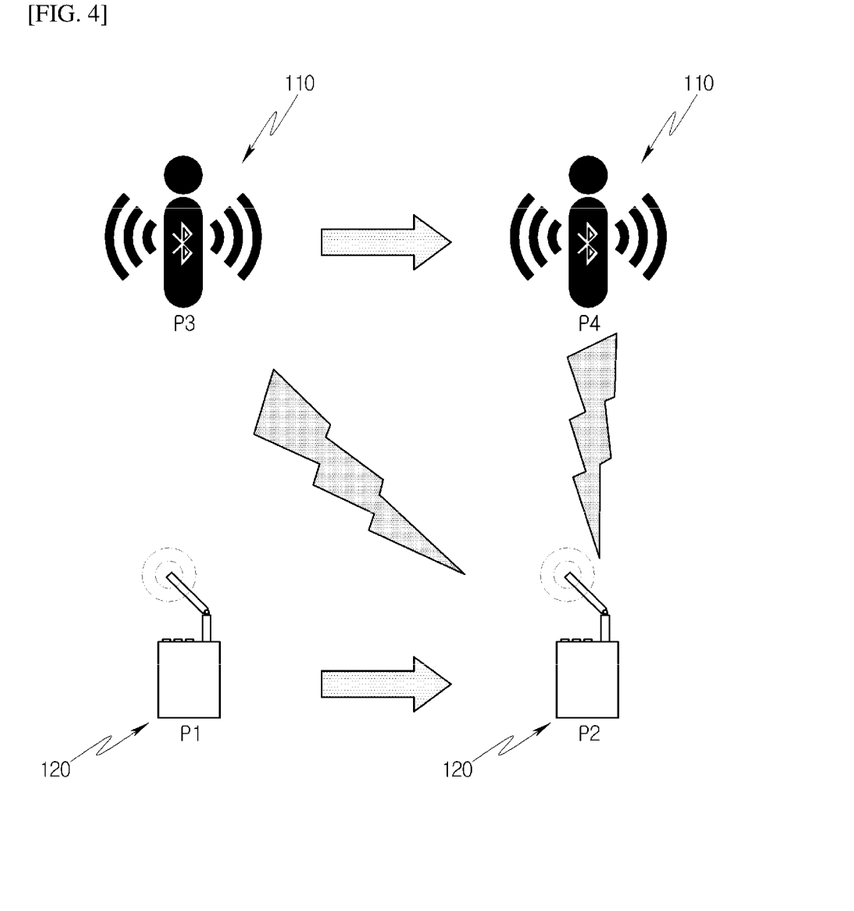
FIG. 4 is a diagram illustrating determining a position of a terminal when the beacon and the terminal have moved according to an embodiment of the present disclosure.

FIG. 4 illustrates an instance of terminal position determination according to an embodiment of the present disclosure, in the event that both the beacon and the terminal have moved.

Referring to FIGS. 1 and 4, the terminal 120 may be present within the reception range of the beacon 110, and the first sensor unit 130 may be attached to the terminal 120 to sense the movement of the terminal 120. In addition, the second sensor unit 140 may be attached to the beacon 110 to sense the movement of the beacon 110.

Here, when the terminal 120 is stopped at the first position P1 and the beacon 110 is stopped at the third position P3, each of the first sensing signal of the first sensor unit 130 and the second sensing signal of the second sensor unit 140 may be a steady-state signal. The terminal 120 may determine that the terminal 120 has stopped through the sensing signal that is constantly displayed, and the beacon 110 may determine that the beacon 110 has stopped through the sensing signal that is constantly displayed. In this case, since both the terminal 120 and the beacon 110 are stationary, the beacon 110 may not unnecessarily transmit the beacon signal, and the terminal 120 may turn off the reception mode so that a beacon signal is not unnecessarily received.

When the terminal 120 has moved from the first position P1 to the second position P2 and the beacon 110 has moved from the third position P3 to the fourth position P4, each of the first sensing signal of the first sensor unit 130 and the second sensing signal of the second sensor unit 140 may vary from its previous steady state. The terminal 120 may determine that the terminal 120 has moved through the varied first sensing signal, and the beacon 110 may determine that the beacon 110 has moved through the varied second sensing signal. In this case, since the terminal 120 and the beacon 110 have both moved, the beacon 110 may transmit the beacon signal for determining the position of the terminal 120, and the terminal 120 may turn on the reception mode to receive the beacon signal. Therefore, it is possible to transmit and receive the beacon signal only when the movement of at least one of the terminal 120 and the beacon 110 is sensed, thus saving the batteries of the terminal 120 and the beacon 110.

As described above, according to an embodiment of the present disclosure, it is possible to achieve the position determination device for a terminal, which samples the signal of the sensor attached to at least one of the beacon and the terminal to transmit or receive the signal of the beacon only when the position of at least one of the beacon and the terminal varies, thus determining the position of the terminal.

Figure 5:
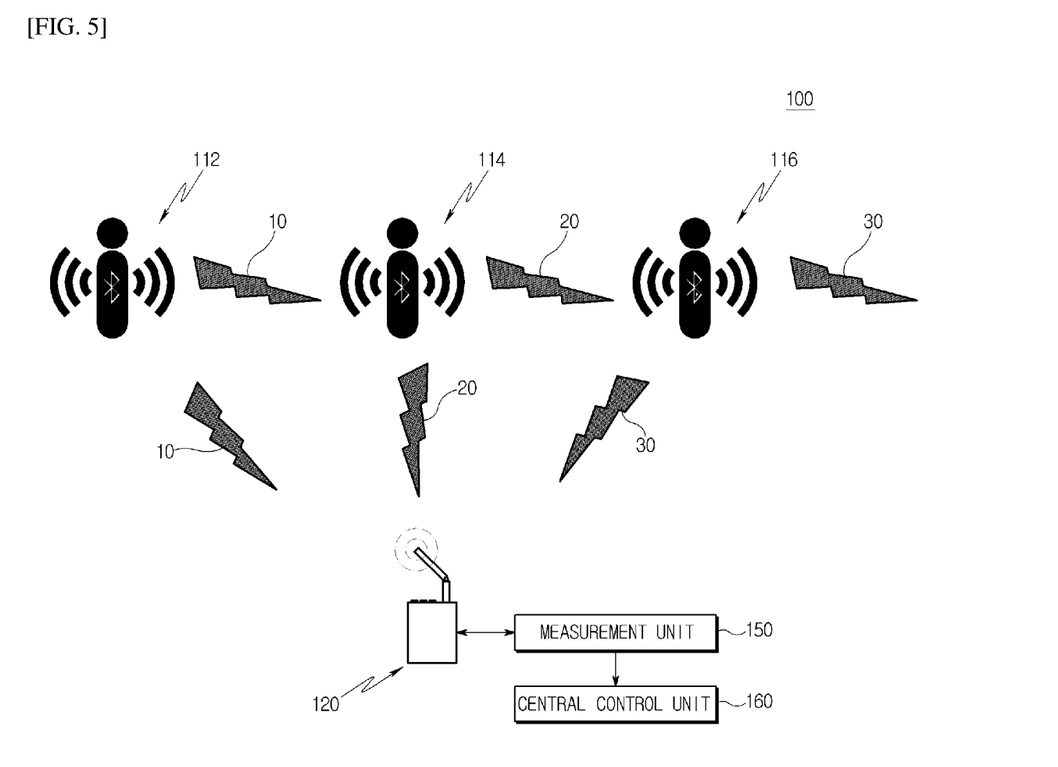
FIG. 5 is a diagram illustrating a configuration of the position determination device for the terminal according to an embodiment of the present disclosure.

FIG. 5 illustrates a configuration of the device 100 for determining the position of a terminal according to an embodiment of the present disclosure.

Referring to FIG. 5, the device 100 may include a first beacon 112, a second beacon 114, a third beacon 116, the terminal 120, the measurement unit 150, and the central control unit 160.

The first beacon 112 may transmit a first beacon signal 10. The first beacon 112 may be fixedly installed at a certain position. The first beacon 112 may periodically transmit the first beacon signal 10.

The second beacon 114 may transmit a second beacon signal 20 upon receiving the first beacon signal 10. The second beacon 114 may be fixedly installed at a certain position. The second beacon 114 may be synchronized with the first beacon 112 to receive the first beacon signal 10 transmitted by the first beacon 112. By fixedly installing each of the first beacon 112 and the second beacon 114, a distance between the first and second beacons 112 and 114 may be known and constant. Accordingly, a first propagation time until the first beacon signal 10 reaches from the first beacon 112 to the second beacon 114 may be known and constant. That is, the first propagation time may be determined according to the distance between the first beacon 112 and the second beacon 114.

The second beacon 114 may wait for a first waiting time after receiving the first beacon signal 10 and then transmit the second beacon signal 20. The first waiting time may indicate the minimum time required to transmit the second beacon signal 20 after receiving the first beacon signal 10. The first waiting time may be a time required for the second beacon 114 to be switched from a reception mode to a transmission mode and may include a required time (delay) to wait in order to prevent interference of signals when other beacons are transmitting other position signals to the terminal 120. Here, the first waiting time may be a predetermined time. The second beacon 114 may transmit the second beacon signal 20 after the first waiting time.

The third beacon 116 may transmit a third beacon signal 30 upon receiving the second beacon signal 20. The third beacon 116 may be fixedly installed at a certain position. The third beacon 116 may be synchronized with the second beacon 114 to receive the second beacon signal 20 transmitted by the second beacon 114. By fixedly installing each of the second beacon 114 and the third beacon 116, a distance between the second and third beacons 114 and 116 may be known and constant. Accordingly, a second propagation time until the second beacon signal 20 reaches from the second beacon 114 to the third beacon 116 may be known and constant. That is, the second propagation time may be determined according to the distance between the second beacon 114 and the third beacon 116.

The third beacon 116 may wait for a second waiting time after receiving the second beacon signal 20 and then transmit the third beacon signal 30. The second waiting time may indicate the minimum time required to transmit the third beacon signal 30 after receiving the second beacon signal 20. The second waiting time may be a time required for the second beacon 114 to be switched from a reception mode to a transmission mode and may include a required time (delay) to wait in order to prevent interference of signals when other beacons are transmitting other position signals to the terminal 120. Here, the second waiting time may be a predetermined time. The second beacon 114 may transmit the second beacon signal 20 after the second waiting time.

The terminal 120 may receive the first beacon signal 10, the second beacon signal 20, and the third beacon signal 30. The terminal 120 may determine a distance between the terminal 120 and each of the first beacon 112, the second beacon 114, and the third beacon 116 based on the first beacon signal 10, the second beacon signal 20, and the third beacon signal 30, respectively, and may determine the position of the terminal 120 based on the determined distances.

The terminal 120 may determine the distance between the first beacon 112 and the terminal 120 based on a first reception time (T1) taken until the first beacon signal 10 transmitted by the first beacon 112 is received by the terminal 120. That is, the first reception time may be the time required for the first beacon signal 10 to reach the terminal 120 after transmission from the first beacon 112. Therefore, the terminal 120 may determine the distance between the first beacon 112 and the terminal 120 based on the first reception time during which the first beacon signal 10 has been transmitted and received. For example, if the first beacon signal 10 is transmitted by the first beacon 112 and reaches the terminal 120 after ten seconds, the terminal 120 may then receive the first beacon signal 10. That is, the first reception time taken until the first beacon signal 10 is received by the terminal 120 may be ten seconds. As the distance between the first beacon 112 and the terminal 120 becomes farther, the first reception time becomes longer, and as the distance between the first beacon 112 and the terminal 120 becomes shorter, the first reception time becomes shorter, such that the terminal 120 may determine the distance between the first beacon 112 and the terminal 120 through the first reception time.

In addition, the terminal 120 may determine the distance between the second beacon 114 and the terminal 120 based on a second reception time (T2) taken until the second beacon signal 20 transmitted by the second beacon 114 is received. The second reception time may include the first propagation time taken until the first beacon signal 10 reaches the second beacon 114, the first waiting time, and a first arrival time taken until the second beacon signal 20 reaches from the second beacon 114 to the terminal 120. Specifically, the second beacon 114 may receive the first beacon signal 10 only after the first beacon 112 has transmitted the first beacon signal 10 and the first beacon signal 10 has reached the second beacon 114. Therefore, the time required for the terminal 120 to receive the first beacon signal 10 may include the first propagation time, which is the time required for the first beacon signal 10 to reach the second beacon 114 from the first beacon 112. In addition, the time required for the terminal 120 to receive the second beacon signal 20 may include the first waiting time, which is the time that the second beacon 114 waits after receiving the first beacon signal 10 before transmitting the second beacon signal 20. That is, the terminal 120 may receive the second beacon signal 20 only after the second beacon 114 has transmitted the second beacon signal 20 after the first waiting time and the second beacon signal 20 has reached the terminal 120. Therefore, the time required for the terminal 120 to receive the second beacon signal 20 may include the first arrival time, which is the time required for the second beacon signal 20 to reach the terminal 120 from the second beacon 114. That is, a second reception time taken until the second beacon signal 20 is received by the terminal 120 may be a time that is the sum of the first propagation time, the first waiting time, and the first arrival time. For example, when the first beacon signal 10 is transmitted by the first beacon 112 and reaches the second beacon 114 after ten seconds, the second beacon 114 may receive the first beacon signal 10. The second beacon 114 may transmit the second beacon signal 20 after waiting for, say, five seconds that is the first waiting time. In addition, when the second beacon signal 20 is transmitted by the second beacon 114 and reaches the terminal 120 after ten seconds, the terminal 120 may receive the second beacon signal 20. That is, the second reception time taken until the second beacon signal 20 is received by the terminal 120 may total 25 seconds. Here, since the first propagation time and the first waiting time of the first beacon 112 are predetermined, the terminal 120 may determine the first arrival time. As the distance between the second beacon 114 and the terminal 120 becomes farther, the first arrival time becomes longer, and as the distance between the second beacon 114 and the terminal 120 becomes closer, the first arrival time becomes shorter, such that the terminal 120 may determine the distance between the second beacon 114 and the terminal 120 through the first arrival time. Here, longer reception times for the second beacon signal 20 to reach the terminal 120 generally enable a more precise determination of the distance between the second beacon 114 and the terminal 120. In addition, since the second beacon 114 transmits the second beacon signal 20 only upon receiving the first beacon signal 10, the second reception time taken until the second beacon signal 20 is received by the terminal 120 may be measured accurately.

In addition, the terminal 120 may determine the distance between the third beacon 116 and the terminal 120 based on a third reception time (T3) taken until the third beacon signal 30 transmitted by the third beacon 116 is received. The third reception time may include the first propagation time, the first waiting time, the second propagation time (for the second beacon signal 20 to reach the third beacon 116), the second waiting time, and a second arrival time taken until the third beacon signal 30 reaches the terminal 120 from the third beacon 116. Specifically, the second beacon 114 may receive the first beacon signal 10 only after the first beacon 112 has transmitted the first beacon signal 10 and the first beacon signal 10 has reached the second beacon 114. Therefore, the time required for the terminal 120 to receive the third beacon signal 30 may include the first propagation time, which is the time required for the first beacon signal 10 to reach the second beacon 114 from the first beacon 112. In addition, the time required for the terminal 120 to receive the third beacon signal 30 may include the first waiting time, which is the time that the second beacon 114 waits after receiving the first beacon signal 10 and before transmitting the second beacon signal 20. In addition, the third beacon 116 may receive the second beacon signal 20 only after the second beacon 114 has transmitted the second beacon signal 20 after the first waiting time and the second beacon signal 20 has reached the third beacon 116. Therefore, the time required for the terminal 120 to receive the third beacon signal 30 may include the second propagation time, which is the time required for the second beacon signal 20 to reach the third beacon 116 from the second beacon 114. In addition, the time required for the terminal 120 to receive the third beacon signal 30 may include the second waiting time, which is the time that the third beacon 116 waits after receiving the second beacon signal 20 and before transmitting the third beacon signal 30. In addition, the terminal 120 may receive the third beacon signal 30 only after the third beacon 116 has transmitted the third beacon signal 30 after the second waiting time and the third beacon signal 30 has reached the terminal 120. Therefore, the time required for the terminal 120 to receive the third beacon signal 30 may include a third arrival time, which is the time required for the third beacon signal 30 to reach the terminal 120 from the third beacon 116. That is, a third reception time taken until the third beacon signal 30 is received by the terminal 120 may be a time that is the sum of the first propagation time, the first waiting time, the second propagation time, the second waiting time, and the second arrival time.

For example, if the first beacon signal 10 is transmitted by the first beacon 112 and reaches the second beacon 114 after ten seconds, the second beacon 114 may then receive the first beacon signal 10. The second beacon 114 may transmit the second beacon signal 20 after waiting for, say, five seconds that is the first waiting time. In addition, if the second beacon signal 20 is transmitted by the second beacon 114 and reaches the third beacon 116 after ten seconds, the third beacon 116 may then receive the third beacon signal 30. The third beacon 116 may transmit the third beacon signal 30 after waiting for, say, five seconds that is the second waiting time. In addition, if the third beacon signal 30 is transmitted by the third beacon 116 and reaches the terminal 120 after ten seconds, the terminal 120 may then receive the third beacon signal 30. That is, the third reception time taken until the third beacon signal 30 is received by the terminal 120 may total 40 seconds. Here, since the transmission time interval, the first propagation time, the first waiting time, the second propagation time, and the second waiting time of the first beacon 112 are predetermined, the terminal 120 may determine the second arrival time. As the distance between the third beacon 116 and the terminal 120 becomes farther, the second arrival time become longer, and as the distance between the third beacon 116 and the terminal 120 becomes closer, the second arrival time become shorter, such that the terminal 120 may determine the distance between the third beacon 116 and the terminal 120 through the second arrival time. Here, longer reception times for the third beacon signal 30 to reach the terminal 120 generally enable a more precise determination of the distance between the third beacon 116 and the terminal 120. In addition, since the third beacon 116 transmits the third beacon signal 30 only upon receiving the first beacon signal 10 and the second beacon signal 20, a third reception time taken until the third beacon signal 30 is received by the terminal 120 may be measured accurately.

In addition, the terminal 120 may further include a storage unit (not shown) for storing values for each of the first propagation time, the first waiting time, the second propagation time, and the second waiting time. The stored values may be predetermined values.

In addition, the first propagation time, the first waiting time, the second propagation time, and the second waiting time may be stored in a separate database. The terminal 120 may reflect the information stored in the database to the second reception time and the third reception time to determine the distance between the terminal 120 and the second beacon and the third beacon.

In addition, the terminal 120 may further include the measurement unit 150 for determining the position of the terminal 120 based on the first beacon signal 10, the second beacon signal 20, and the third beacon signal 30 that are respectively received from the beacons 112, 114, and 116. The measurement unit 150 may determine the position of the terminal 120 more precisely as the number of beacon signals received by the terminal 120 increases. The measurement unit 150 may confirm the information on distances between the terminal 120 and the respective beacons 112, 114, and 116 based on the beacon signals received from a plurality of positions, and may determine the position of the terminal 120 based on the distance information. The measurement unit 150 may determine the position of the terminal 120 to transmit it to the central control unit 160.

The central control unit 160 may store the information on the received position of the terminal 120. For example, the central control unit 160 may be a platform for displaying the position information of the terminal 120, and such a platform may be applied to a smart factory.

Although an embodiment of the present disclosure describes three beacons, there is no limitation on the number of beacons according to the present disclosure. That is, an unlimited number of beacons may be provided throughout a space in which the position determination device of the present disclosure is applied to sense the movement of a terminal in real time.

Figure 6:
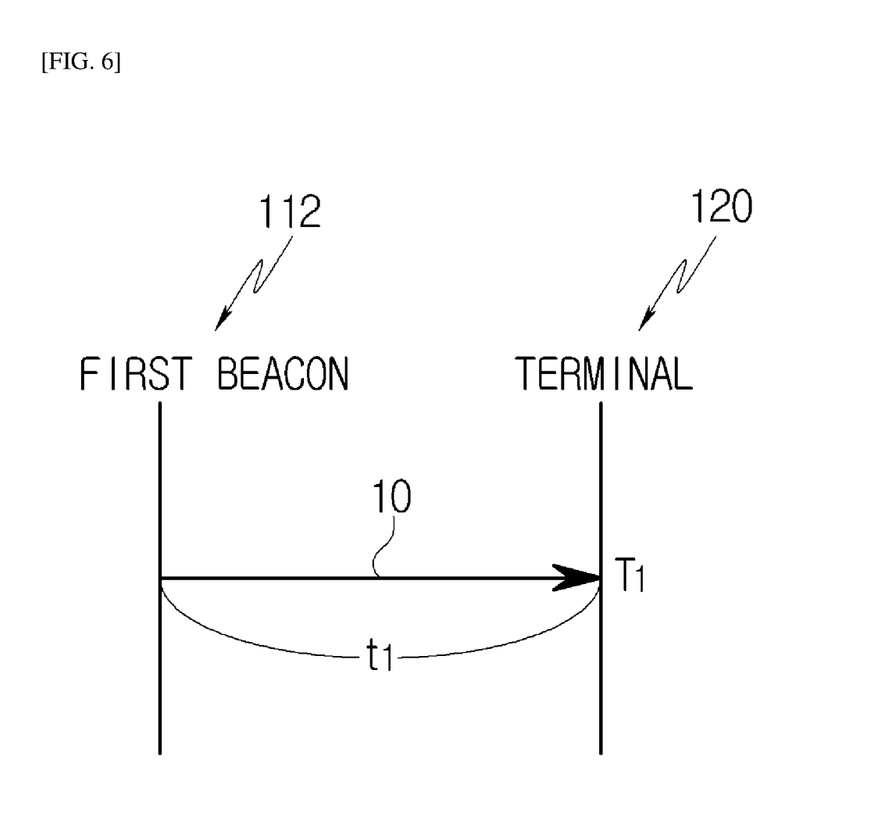
FIG. 6 is a diagram illustrating a first reception time until the terminal receives a first beacon signal according to an embodiment of the present disclosure.

FIG. 6 illustrates a first reception time T1 according to an embodiment of the present disclosure, which is a time for the terminal to receive a first beacon signal.

Referring to FIG. 6, the first beacon 112 may transmit the first beacon signal 10. The terminal 120 may receive the first beacon signal 10 when the first beacon 112 transmits the first beacon signal 10. At this time, a time T1 required for the terminal 120 to receive the first beacon signal 10 according to the distance between the first beacon 112 and the terminal 120 may vary. Here, since the terminal 120 directly receives the first beacon signal 10 transmitted by the first beacon 112, a time t1 required for the first beacon signal 10 to reach the terminal 120 from the first beacon 112 may be the same as the time T1. That is, the terminal 120 may determine the distance between the terminal 120 and the first beacon 112 based on the time taken until the first beacon signal 10 is received.

Figure 7:
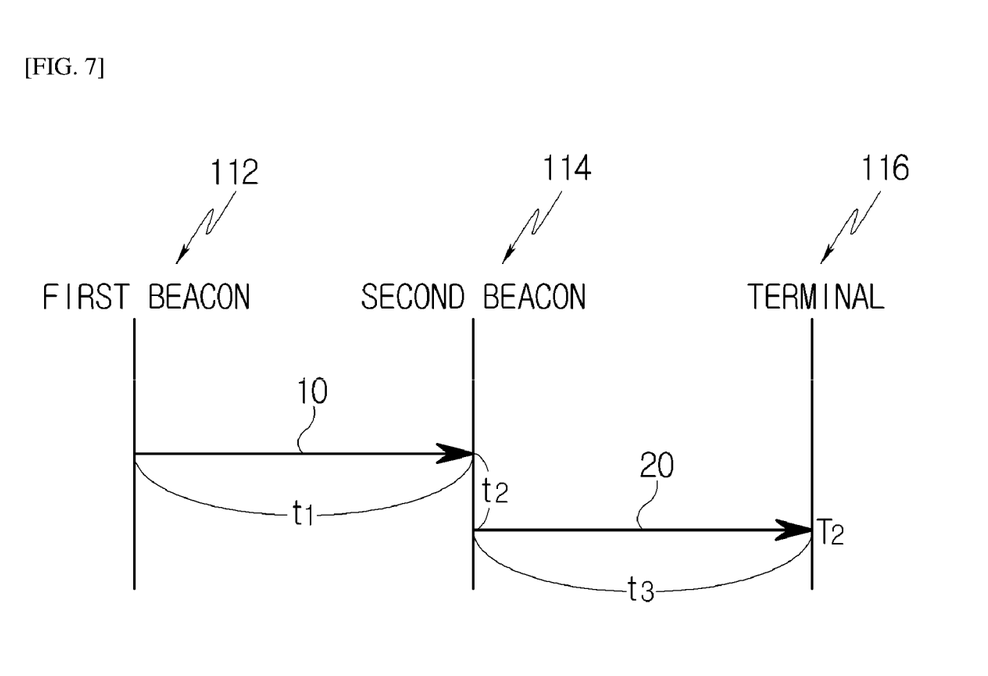
FIG. 7 is a diagram illustrating a second reception time until the terminal receives a second beacon signal according to an embodiment of the present disclosure.

FIG. 7 illustrates a second reception time T2 according to an embodiment of the present disclosure, which is a time for the terminal to receive a second beacon signal.

Referring to FIG. 7, the first beacon 112 may transmit the first beacon signal 10. The second beacon 114 may receive the first beacon signal 10 transmitted by the first beacon 112. At this time, since the first beacon 112 and the second beacon 114 are fixedly installed, the distance between the first beacon 112 and the second beacon 114 may be constant. Accordingly, a first propagation time t1 required for the first beacon signal 10 to reach the second beacon 114 from the first beacon 112 may be a predetermined value. The second beacon 114 may have a first waiting time t2 for transmitting the second beacon signal 20 when the first beacon signal 10 is received by the second beacon 114. Thereafter, after the first waiting time t2 has elapsed, the second beacon 114 may transmit the second beacon signal 20, and the terminal 120 may receive the second beacon signal 20. At this time, the reception time required for the terminal 120 to receive the second beacon signal 20 may vary according to the distance between the second beacon 114 and the terminal 120. That is, a first arrival time t3 required for the second beacon signal 20 to reach the terminal 120 from the second beacon 114 may increase or decrease according to the distance between the terminal 120 and the second beacon 114. The second reception time T2 required for the terminal 120 to receive the second beacon signal 20 may be the sum of the first propagation time t1, the first waiting time t2, and the first arrival time t3. Here, since the first propagation time t1 and the first waiting time t2 are predetermined values, the terminal 120 may recognize the first arrival time t3 and determine the distance between the terminal 120 and the second beacon 114 accordingly.

Figure 8:
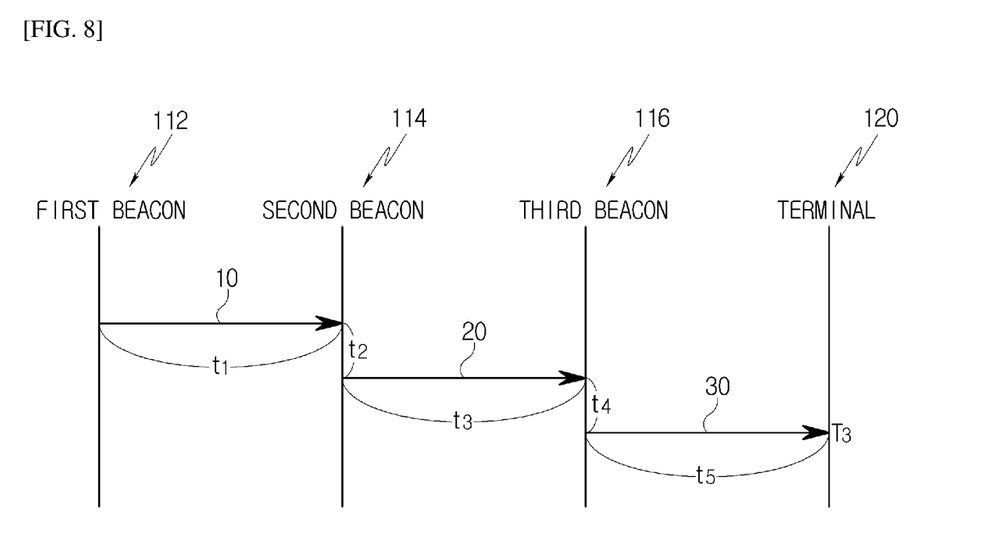
FIG. 8 is a diagram illustrating a third reception time until the terminal receives a third beacon signal according to an embodiment of the present disclosure.

FIG. 8 illustrates a third reception time T3 according to an embodiment of the present disclosure, which is a time for the terminal to receive a third beacon signal.

Referring to FIG. 8, the first beacon 112 may transmit the first beacon signal 10. The second beacon 114 may receive the first beacon signal 10 transmitted by the first beacon 112. At this time, since the first beacon 112 and the second beacon 114 are fixedly installed, the distance between the first beacon 112 and the second beacon 114 may be constant. Accordingly, the first propagation time t1 required for the first beacon signal 10 to reach the second beacon 114 from the first beacon 112 may be a predetermined value. The second beacon 114 may have the first waiting time t2 for transmitting the second beacon signal 20 when the first beacon signal 10 is received by the second beacon 114. Thereafter, after the first waiting time t2 has elapsed, the second beacon 114 may transmit the second beacon signal 20, and the third beacon 116 may receive the second beacon signal 20. At this time, since the second beacon 114 and the third beacon 116 are fixedly installed, the distance between the second beacon 114 and the third beacon 116 may be constant. Accordingly, a second propagation time t3 required for the second beacon signal 20 to reach the third beacon 116 from the second beacon 114 may be a predetermined value. The third beacon 116 may have a second waiting time t4 for transmitting the third beacon signal 30 when the second beacon signal 20 is received by the third beacon 116. Thereafter, after the second waiting time t4 has elapsed, the third beacon 116 may transmit the third beacon signal 30, and the terminal 120 may receive the third beacon signal 30. At this time, the reception time required for the terminal 120 to receive the third beacon signal 30 may vary according to the distance between the third beacon 116 and the terminal 120. That is, a second arrival time t5 required for the third beacon signal 30 to reach the terminal 120 from the third beacon 116 may increase or decrease according to the distance between the terminal 120 and the third beacon 116. The third reception time T3 required for the terminal 120 to receive the third beacon signal 30 may be the sum of the first propagation time t1, the first waiting time t2, the second propagation time t3, the second waiting time t4, and the second arrival time t5. Here, since the first propagation time t1, the first waiting time t2, the second propagation time t3, and the second waiting time t4 are predetermined values, the terminal 120 may recognize the second arrival time t5 and determine the distance between the terminal 120 and the third beacon 116 accordingly.

As described above, the present disclosure relates to a terminal position determination device, which causes a plurality of beacons to sequentially transmit the beacon signals, determines the distance between the respective beacons and the terminal based on the time during which the beacon signals are transmitted and received, and determines the position of the terminal accordingly.

Those skilled in the art to which the present disclosure pertains will understand that the present disclosure may be implemented in other various forms without departing from the technical spirit or essential characteristics of the present disclosure, so the aforementioned embodiments should not be construed as being limitative. The scope of the present disclosure is disclosed in the following claims rather than the detailed description, and it should be understood that all modifications or variations derived from the meanings and scope of the appended claims and equivalents thereof.

What is claimed is:

1. A system for determining a position of a terminal, the system comprising:
 a beacon for transmitting a beacon signal;
 a terminal for receiving the beacon signal;
 a first sensor attached to the terminal and configured to sense movement of the terminal and to output a first sensing signal indicative of the sensed movement of the terminal;
 a second sensor attached to the beacon and configured to sense movement of the beacon and to output a second sensing signal indicative of the sensed movement of the beacon,
 wherein the terminal has a reception mode for receiving the beacon signal and is configured to turn on/off the reception mode based on the first sensing signal.

2. The system of claim 1, wherein the first sensor comprises one of an acceleration sensor, a gyro sensor, a motion sensor, and a displacement sensor.

3. The system of claim 1, wherein the terminal is configured to turn on the reception mode when the outputted first sensing signal indicates that movement of the terminal is being sensed.

4. The system of claim 1, wherein the terminal is configured to turn off the reception mode when the outputted first sensing signal indicates that no movement of the terminal is being sensed.

5. The system of claim 1, wherein the second sensor comprises one of an acceleration sensor, a gyro sensor, a motion sensor, and a displacement sensor.

6. The system of claim 1, wherein the beacon is configured to transmit the beacon signal when the outputted second sensing signal indicates that movement of the beacon is being sensed.

7. The system of claim 1, further comprising
 a measurement unit connected to the terminal,
 wherein the beacon consists of a plurality of beacons for respectively transmitting a plurality of beacon signals, and the measurement unit is configured to determine a current position of the terminal based on the beacon signal received by the terminal from each of the beacons.

8. The system of claim 1, wherein the terminal is configured to receive from the measurement unit information indicative of the current position of the terminal and to transmit the position information to a central control unit.

9. A system for determining a position of a terminal, the system comprising:
a beacon for transmitting a beacon signal;
a terminal for receiving the beacon signal;
a first sensor attached to the beacon and configured to sense movement of the beacon and to output a first sensing signal indicative of the sensed movement of the terminal;
a second sensor attached to the beacon and configured to sense movement of the beacon and to output a second sensing signal indicative of the sensed movement of the beacon,
wherein the beacon is configured to transmit the beacon signal when the outputted sensing signal indicates that movement of the beacon is being sensed.

10. The system of claim 9, further comprising a measurement unit connected to the terminal and configured to determine a current position of the terminal based on the beacon signal received by the terminal from the beacon.

11. A system for determining a position of a terminal, the device comprising:
a first beacon for transmitting a first beacon signal;
a second beacon for receiving the first beacon signal and for transmitting a second beacon signal after a first waiting time from the reception of the first beacon signal by the second beacon; and
a terminal for receiving the first beacon signal and the second beacon signal, the first beacon signal being received by the terminal at a first reception time from the transmission of the first beacon signal and the second beacon signal being received by the terminal at a second reception time from the transmission of the second beacon signal,
wherein the first beacon signal is transmitted from the first beacon to the second beacon during a first propagation time, and
wherein the terminal is configured to
determine a distance between the first beacon and the terminal based on the first reception time, and
determine a distance between the second beacon and the terminal by reflecting the first propagation time and the first waiting time to the second reception time.

12. The system of claim 11, wherein the second reception time comprises the first propagation time, the first waiting time, and a first arrival time of the second beacon being transmitted from the second beacon to the terminal.

13. The system of claim 11, wherein the first waiting time includes a time required for the second beacon to wait before transmitting the second beacon signal after receiving the first beacon signal.

14. The system of claim 11,
wherein the first propagation time and the first waiting time are predetermined values, and
wherein the terminal is configured to
determine the first arrival time by reflecting the first propagation time and the first waiting time to the second reception time, and
determine the distance between the second beacon and the terminal based on the first arrival time.

15. The system of claim 11, further comprising
a third beacon for receiving the second beacon signal and for transmitting a third beacon signal after a second waiting time from the reception of the second beacon signal by the third beacon,
wherein the second waiting time includes a time required for the third beacon to wait before transmitting the third beacon signal after receiving the second beacon signal.

16. The system of claim 15,
wherein the second beacon signal is transmitted from the second beacon to the third beacon during a second propagation time,
wherein the third beacon signal is received by the terminal at a third reception time from the transmission of the third beacon signal, and
wherein the terminal is configured to determine a distance between the third beacon and the terminal by reflecting the first propagation time, the first waiting time, the second propagation time, and the second waiting time to the third reception time.

17. The system of claim 16, wherein the terminal further comprises a storage unit for storing values of the first propagation time, the first waiting time, the second propagation time, and the second waiting time.

18. The system of claim 16, wherein the third reception time comprises the first propagation time, the first waiting time, the second propagation time, the second waiting time, and a second arrival time of the third beacon being transmitted from the third beacon to the terminal.

19. The system of claim 17,
wherein the first propagation time, the second propagation time, the first waiting time, and the second waiting time are predetermined values, and
wherein the terminal is configured to
determine a third arrival time by reflecting the first propagation time, the first waiting time, the second propagation time, and the second waiting time to the third reception time, and
determine the distance between the third beacon and the terminal based on the second arrival time.

* * * * *